United States Patent
Pu et al.

(10) Patent No.: US 11,937,754 B2
(45) Date of Patent: Mar. 26, 2024

(54) DISHWASHER WITH DUAL WATER ENTRY MODE AND METHOD FOR DETERMINING WATER SUPPLY MODE THEREOF

(71) Applicant: GUANGDONG JIENUO HOUSEHOLD APPLIANCES CO., LTD., Zhongshan (CN)

(72) Inventors: Jie Pu, Zhongshan (CN); Shuntian Yang, Zhongshan (CN); Jianhong Shi, Zhongshan (CN)

(73) Assignee: GUANGDONG JIENUO HOUSEHOLD APPLIANCES CO., LTD., Zhongshan (CN)

( * ) Notice: Subject to any disclaimer, the term of this patent is extended or adjusted under 35 U.S.C. 154(b) by 420 days.

(21) Appl. No.: 17/296,214

(22) PCT Filed: Sep. 16, 2019

(86) PCT No.: PCT/CN2019/105862
§ 371 (c)(1),
(2) Date: May 21, 2021

(87) PCT Pub. No.: WO2020/103543
PCT Pub. Date: May 28, 2020

(65) Prior Publication Data
US 2022/0007916 A1 Jan. 13, 2022

(30) Foreign Application Priority Data

Nov. 23, 2018 (CN) .......................... 201811407535.5
Nov. 23, 2018 (CN) .......................... 201821941388.5
Jan. 14, 2019 (CN) .......................... 201910030977.0

(51) Int. Cl.
*A47L 15/42* (2006.01)
*A47L 15/00* (2006.01)
(Continued)

(52) U.S. Cl.
CPC ....... *A47L 15/4217* (2013.01); *A47L 15/0023* (2013.01); *A47L 15/14* (2013.01);
(Continued)

(58) Field of Classification Search
None
See application file for complete search history.

(56) References Cited

U.S. PATENT DOCUMENTS 3,050,866 A * 8/1962 Macemon ............. A47L 15/488
34/182
3,777,989 A * 12/1973 Pacella ................... A47L 15/46
134/191
(Continued)

FOREIGN PATENT DOCUMENTS

CN 107320043 A 11/2017
CN 107773188 A 3/2018
(Continued)

OTHER PUBLICATIONS

CN 107320043 translation (Year: 2023).*
CN 107773188 translation (Year: 2023).*

*Primary Examiner* — Eric W Golightly
(74) *Attorney, Agent, or Firm* — Georgi Korobanov

(57) ABSTRACT

A dual-mode water inlet dishwasher includes a shell, an inner container, a spraying arm, a washing pump, a heating washing pump, and a respirator water tank which are provided in the shell. A water trough is provided in the inner container. A water inlet of the water trough is connected to the respirator water tank. A water outlet of the water trough is connected to the heating washing pump. The heating washing pump is connected to the spraying arm. The respirator water tank is provided with a respirator body and a water tank body. A tap water inlet, a water-tank water inlet, and a washing water port are provided on the respirator body or the water tank body. The tap water inlet is connected to tap water by means of a solenoid valve. The water-tank water inlet is connected to the water tank by means of a water pump.

9 Claims, 15 Drawing Sheets

(51) Int. Cl.
*A47L 15/14* (2006.01)
*A47L 15/46* (2006.01)
*A47L 15/48* (2006.01)

(52) U.S. Cl.
CPC ....... *A47L 15/4225* (2013.01); *A47L 15/4229* (2013.01); *A47L 15/4285* (2013.01); *A47L 15/4293* (2013.01); *A47L 15/46* (2013.01); *A47L 15/486* (2013.01); *A47L 15/488* (2013.01); *A47L 2401/14* (2013.01); *A47L 2501/01* (2013.01); *A47L 2501/36* (2013.01)

(56) References Cited

U.S. PATENT DOCUMENTS

2004/0177654 A1 9/2004 Marks
2016/0088996 A1* 3/2016 Disch .................. A47L 15/0076
134/56 D

FOREIGN PATENT DOCUMENTS

| | | |
|---|---|---|
| CN | 108065884 A | 5/2018 |
| CN | 108272417 A | 7/2018 |
| CN | 109363596 A | 2/2019 |
| CN | 109602366 A | 4/2019 |
| JP | 2006217965 A | 8/2006 |

* cited by examiner

DISHWASHER WITH DUAL WATER ENTRY MODE AND METHOD FOR DETERMINING WATER SUPPLY MODE THEREOF

FIELD OF THE INVENTION

The present invention relates to a dishwasher with a dual water entry mode and its method for determining a water supply mode.

BACKGROUND OF THE INVENTION

In general, tap water is supplied to a dishwasher or water is added manually into a water tank and provided for washing, and a simple tap water supply has strict requirements on users' using environment and usually needs to renovate the domestic water supply channel and the shortcomings of poor mobility after installation and more laborious work of the manual addition of water, and thus bringing tremendous inconvenience to the users. In two water entry modes, the dishwasher has to select a water entry mode manually, and it also brings tremendous inconvenience to the users.

SUMMARY OF THE INVENTION

Technical Problem

To overcome the shortcomings and deficiencies of the prior art, an objective of the invention is to provide a dishwasher with a dual water entry mode and its method for determining a water supply mode, wherein a tap water inlet and a water-tank water inlet formed on a respirator or a water tank and a washing water port are provided for integrating two water entry modes into the respirator to avoid too many components in a water tank that occupy the limited volume of the water tank, so as to increase the water storage capacity of the water tank. In the meantime, the tap water inlet and the water tank inlet are one-way valves that provide a prerequisite of integrating a dual-mode water channel into the same water channel to achieve the effects of sharing the water channel, reducing the level of difficulty of the technology and production, and the respirator integrates the functions of breathing, dual-mode water channel, anti-overflow and drainage. The dishwasher has the features of simple structure, multi-function, and easy and convenient installation. With the control of the solenoid valve and the water pump by the control unit, the amount of water in the water channel can be measured to confirm the water entry mode, so as to achieve the effects of intellectually identifying the water entry mode and providing simple and convenient operations to facilitate the use by users.

Solution to the Problem

Technical Solution

To achieve the aforementioned and other objectives, the present invention provides the following solution.

A dishwasher with a dual water entry mode comprises: a shell, and an inner container, a spraying arm, a heating device, a washing pump, a water discharging pump and a respirator water tank disposed in the shell, characterized in that the respirator water tank is used for supplying water to the inner container; the heating device is used for heating washing water; the washing pump is coupled to the inner container and the spraying arm and provided for circulating the washing water, and the water discharging pump is coupled to the inner container and the outside for discharging water; a water softener is either or not installed between the respirator water tank and a water supply channel of the inner container; the respirator water tank comprises a respirator body and a water tank body, and the respirator body or the water tank body has a tap water inlet, a water-tank water inlet and a washing water port, and the tap water inlet is connected to tap water through a solenoid valve, and the water-tank water inlet is coupled to a water tank through the water pump, and both of the tap water inlet and the water-tank water inlet are communicated with the washing water port, and the washing water port is coupled to the inner container of the dishwasher body or the water softener, and a front opening of the inner container has a door body installed thereon. The dishwasher has a respirator water tank that integrates a water tank with the respirator to achieve the effects of reducing the quantity of components and the pressure of inventory, simplifying the production process, increasing production efficiency, and selectively providing a dual water entry mode (including a tap-water mode and a water-tank water mode) to the dishwasher to facilitate the use by users.

In one or more embodiments, the respirator water tank has a water channel with an end coupled to the washing water port and the other end coupled to one or more water inlets selected from the tap water inlet and the water-tank water inlet, and both of the tap water inlet and the water-tank water inlet are one-way valves, and the water channel has a flowmeter for detecting the flow of the water channel, and the highest point of the water channel is slightly higher than the highest water level of the respirator water tank. By the flowmeter installed on the water channel, the amount of inputted water can be controlled precisely, while the existence of the one-way valve can prevent from flowing in a wrong direction or back flowing, and the highest point of the water channel is higher than the highest water level of the respirator water tank to form a level difference and prevent water from flowing from the respirator water tank towards the inner container all the time.

In one or more embodiments, the respirator body has a breathing hole communicated with the inner container, and a cover of the respirator body has a vent hole configured to be opposite to the breathing hole, and the water channel has a vent communicated with the breathing hole to achieve a balance between the internal and external air pressures, and the inner container has a drain, and the respirator body has an inverted U-shaped pipe coupled to the drain for drainage. By the installation of the U-shaped pipe, the water backflow of the drain pipe can be avoided, and an overflow channel is formed between the U-shaped pipe and the breathing hole, so that when the dishwasher has a failure and the water level of the inner container is higher than the position of the breathing hole, water will be discharged from the breathing hole directly into the overflow channel and entered into the drain section before being discharged to the outside of the dishwasher.

In one or more embodiments, the water channel has a vent communicated with the breathing hole for balancing the air pressures of the water channel, the water tank body, and the inner container, and the overflow channel has a one-way valve, wherein the one-way valve allows the water at the overflow channel water inlet to flow only in a direction towards the water outlet of the overflow channel.

In one or more embodiments, the inner container has an upper shelf and a lower shelf, and the spraying arm has an upper spraying arm and a lower spraying arm, and the lower spraying arm is disposed at the bottom of the lower shelf, and the upper spraying arm is disposed at the top or backside of the upper shelf. By the installation of the double-layered shelf, the internal space of the inner container is fully utilized to avoid wasting the upper space of the lower shelf and increase the quantity of tableware put in the dishwasher. In the meantime, the installation of the lower spraying arm provides a spray from the top and the bottom to achieve the effects of multangular washing, good cleaning effect, and less cleaning dead spots.

In one or more embodiments, a bake-drying device is installed between the inner container and the shell and provided for supplying warm air, and the bake-drying device comprises a fan, a heating device and a ventilation pipe, and the ventilation pipe is communicated with the fan and the inner container, and the heating device is installed at an air channel between the fan and the inner container. While the tableware is being washed in the dishwasher, the tableware is baked and dried, so that users can have dry tableware available quickly, and the moisture in the dishwasher can be reduced quickly to achieve the effects of shortening the time having moisture, avoiding the breeding of bacteria in large quantities, and keeping the dishwasher clean and sanitary.

In one or more embodiments, the warm air inlet of the inner container is disposed at the bottom of the inner container, and the warm air outlet of the inner container is disposed at the top of the inner container, and the warm air inlet and the warm air outlet produce a sideway (left-right) convection, and the warm air inlet is disposed at the bottom of the inner container to assist ascending the warm air to improve the motion path of the warm air. In the meantime, the warm air outlet and the warm air inlet produce a convection effect to improve the air speed and the drying effect effectively.

A dishwasher method for determining a water supply mode comprises a dishwasher body and a control unit, and the dishwasher body includes the aforementioned dishwasher with a dual water entry mode comprising a respirator body and a water tank body, and the respirator body or the water tank body has a tap water inlet, a water-tank water inlet and a washing water port, and the tap water inlet is connected to tap water through a solenoid valve, and the water-tank water inlet is coupled to a water tank body through a water pump, and the tap water inlet and the water-tank water inlet share a common water channel which is communicated with the washing water port, and the washing water port is coupled to an inner container of the dishwasher body or a water softener, and the water channel is curved upward in a direction from the water tank body or the respirator body towards the respirator body or the water tank body and extended through the respirator body, and then parallelly returned to the water tank body. The water channel has a flowmeter, and the control unit is electrically coupled to the flowmeter, the water pump and the solenoid valve; and the method comprises the following steps:

P1: Turn on the power, and control and open a solenoid valve by a control unit.

P2: Measure flow data of a water channel by a flowmeter, and send the flow data to the control unit.

P3: Compare the flow data by the control unit. If the flow data is equal to smaller than a predetermined value, then the control unit will decide not to input water from a tap water inlet. If the flow data is greater than the predetermined value, then the control unit will decide to input water from the tap water inlet and set the water entry mode of the dishwasher body to a tap water supply mode.

P4: If the control unit decides not to input water from the tap water inlet, then the control unit will shut the solenoid valve, and then the control unit will drive the water pump to stop quickly.

P5: Measure the flow data of the water channel by the flowmeter again and send the flow data to the control unit.

P6: Compare the flow data by the control unit. If the flow data is equal to or smaller than the predetermined value, then the control unit will decide not to input water from the water tank inlet. If the flow data is greater than the predetermined value, then the control unit will determine to input water from the water tank inlet and set the water entry mode of the dishwasher body to a water-tank water supply mode;

P7: End the determination, and enter the dishwasher body to a dishwashing mode.

In one or more embodiments, the method further comprises an alarm module electrically coupled to the control unit. If the control unit decides not to input water from the tap water inlet in the step P3 and not to input water from the water-tank water inlet in the step P6, then the control unit will control the alarm module to issue an alarm, and the dishwasher body will not enter into the dishwashing mode. If the control unit determines that the water entry mode of the dishwasher body is the tap water supply mode, the control unit will end the determination and enter the dishwasher into the dishwashing mode, wherein the order for the control unit to determine the dishwasher water entry mode to be the tap water supply mode and the water-tank water supply mode can be changed.

Advantageous Effects

The present invention has the following advantageous effects: The present invention provides a dishwasher with a dual water entry mode and its method for determining a water supply mode. By the design of the tap water inlet, the water-tank water inlet and the washing water port formed on the respirator or the water tank, two water entry modes are integrated into the respirator to avoid to many components in the water tank that will occupy the limited volume of the water tank, so as to improve the water storage capacity of the water tank. In the meantime, the tap water inlet and the water tank inlet have a one-way valve, and these one-way valves that provide a prerequisite of integrating a dual-mode water channel into the same water channel to achieve the effects of sharing the water channel, reducing the level of difficulty of the technology and production, and the respirator integrates the functions of breathing, dual-mode water channel, anti-overflow and drainage. The dishwasher has the features of simple structure, multi-function, and easy and convenient installation. With the control of the solenoid valve and the water pump by the control unit, the amount of water in the water channel can be measured to confirm the water entry mode, so as to achieve the effects of intellectually identifying the water entry mode and providing simple and convenient operations to facilitate the use by users.

BRIEF DESCRIPTON OF THE DRAWINGS

DESCRIPTION OF THE PREFERRED EMBODIMENTS

Exemplary Embodiments

Figure 1:
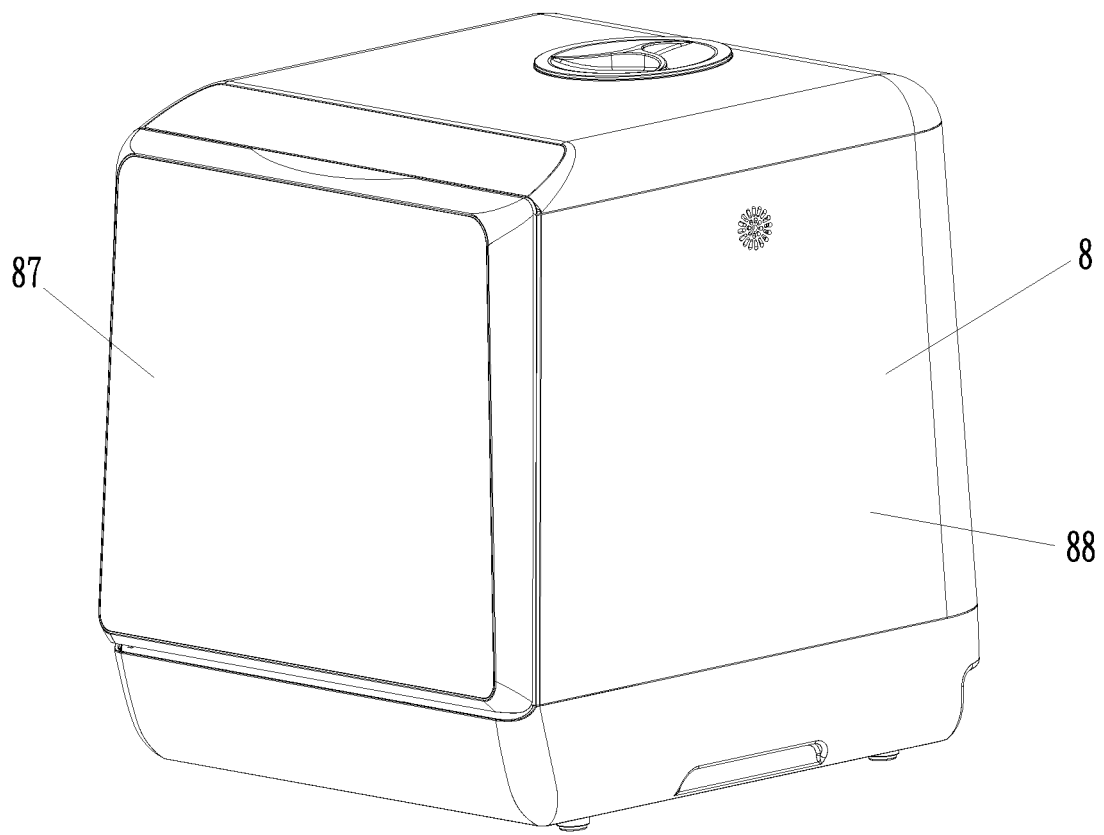
FIG. 1 is a schematic view of the whole structure of a dishwasher with a dual water entry mode in accordance with a first embodiment of the present invention.
Figure 2:
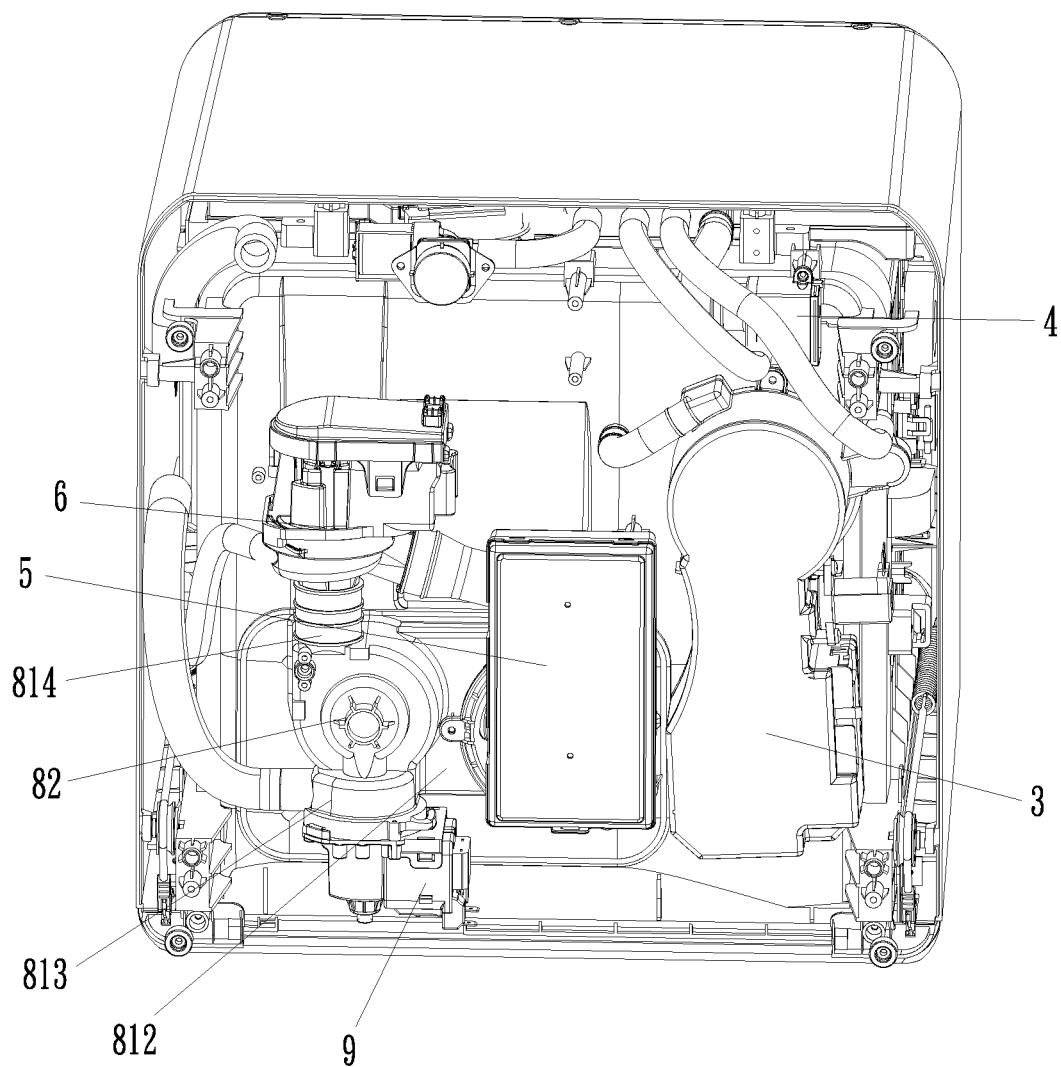
FIG. 2 is a schematic view of the bottom structure of a dishwasher with a dual water entry mode in accordance with the first embodiment of the present invention.
Figure 3:
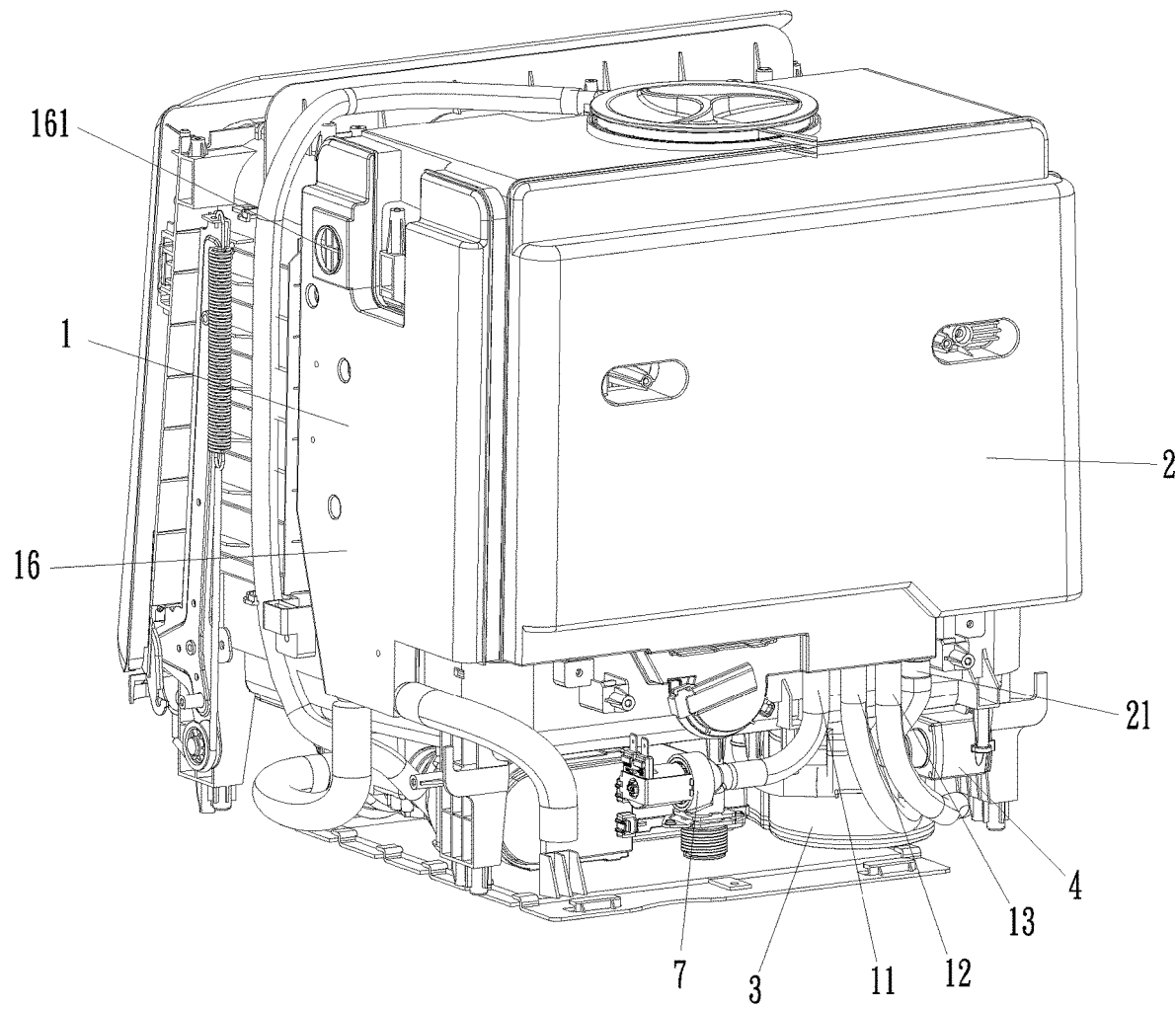
FIG. 3 is a schematic view of the structure of a water tank and a respirator of a dishwasher with a dual water entry mode in accordance with the first embodiment of the present invention.

This invention will become clearer in light of the following detailed description of an illustrative embodiment of this invention described in connection with the drawings.

Embodiment

With reference to FIGS. 1, 2, 3, 4, 5, 6, 7, 10, 14 and 15 for a dishwasher with a dual water entry mode in accordance with the first embodiment of the present invention, the dishwasher comprises a shell 88 and an inner container 81, a spraying arm 85, a heating washing pump 5, a washing pump 6, a water discharging pump 9 and a respirator water tank 2 installed in the shell 88. The respirator water tank 2 is provided for supplying water to the inner container 81, and a water sink 812 is concavely formed at the bottom of the inner container 81, and the heating washing pump 5 in installed on the water sink 812 and provided for heating washing water, and the water sink 812 has a drain 813 and a water outlet 814, and the washing pump 6 is connected to the water outlet 814 of the water sink 812 at the bottom of the inner container 81 and the spraying arm 85 for supplying the water inside the inner container 81 to the spraying arm 85 while circulating and using the water in loops to save water. The water discharging pump 9 is connected to the drain 813 of the water sink 812 of the inner container 81 and the respirator water tank 2 for water draining, and a water softener 3 is installed between the respirator water tank 2 and a water supply channel of the inner container 81 and provided for softening water to avoid clogging of pipes, and the respirator water tank 2 includes a respirator body 1 and a water tank body 2, and the respirator body 1 or the water tank body 2 has a tap water inlet 11, a water-tank water inlet 12 and a washing water port 13, and the tap water inlet 11 is connected to tap water through a solenoid valve 7, and the water-tank water inlet 12 is connected to the water tank body 2 through the water pump 4, and both of the tap water inlet 11 and the water-tank water inlet 12 are communicated with the washing water port 13, and the washing water port 13 is connected to the inner container 81 of the dishwasher body 8 or the water softener 3, and a front opening of the inner container 81 has a door body 87.

Preferably, the water softener 3 is not installed between the respirator water tank 2 and the inner container 81, but the respirator water tank 2 is communicated directly with the inner container 81 for supplying water to the inner container 81.

Further, the respirator water tank 2 has a water channel 15 with an end coupled to the washing water port 13 and the other end coupled to one or more of the tap water inlet 11 and the water-tank water inlet 12, and both of the tap water inlet 11 and the water-tank water inlet 12 are one-way valves 14, and the water channel 15 has a flowmeter 17 for measuring the flow in the water channel to control the amount of water precisely, and the highest point of the water channel 15 is slightly higher than the highest water level of the respirator water tank 2. By the installation of the flowmeter 17 on the water channel 15, the amount of inputted water of the inner container 81 can be controlled precisely while the existence of the one-way valves 14 can prevent water from flowing in a wrong direction or back flowing, and the highest point of the water channel is higher than the highest water level of the respirator water tank 2 to forma level difference to prevent water of the respirator water tank 2 from flowing towards the inner container 81 all the time. When the water channel 15 is coupled to the tap water inlet 11 and the water-tank water inlet 12 at the same time, the tap water inlet 11 and the water-tank water inlet 12 share one water channel 15.

Further, the water channel 15 has a flowmeter 17 for measuring the flow of the water channel 15, and the flowmeter 17 and a turbine are working together to measure the flow of the water channel.

Further, the respirator body 1 has a breathing hole 18 communicated with the inner container of the dishwasher body, and a cover 16 of the respirator body 1 has a vent hole 161 configured to be opposite to the breathing hole 18 for improving the ventilation rate, and air can be entered directly from the vent hole 161 of the cover 16 of the respirator body 1 into the breathing hole 18, and the water channel 15 has a vent 151 communicated with the breathing hole 18, so that the water in the water channel 15 is sucked reversely, and the vent 151 sucks the air on the respirator body 1 and the breathing hole 18 to prevent the water from being sucked reversely.

Further, the respirator body 1 is invertedly installed with a U-shaped pipe 19, and the U-shaped pipe 19 has an end coupled to a water discharging pump and the other end coupled to an external drain pipe, and the installation of the U-shaped pipe 19 can seal the fluid and prevent bad smell, while the inverted U-shaped pipe 19 has a height difference to prevent the sewage of the drain pipe from pouring into the dishwasher.

Further, the respirator body 1 further has an overflow channel 191, the overflow channel 191 coupled to a drain section of the U-shaped pipe 19 to form an anti-overflow structure, and the overflow can be entered into the drain section of the U-shaped pipe 19 through the overflow channel 191 and discharged to the outside.

Further, the overflow channel 19 has a one-way valve 192, and the one-way valve 192 allows the water at the water inlet of the overflow channel 191 to move only in a direction towards the water outlet of the overflow channel 191 for overflow.

Further, the water tank body 2 is coupled to the upper end of the respirator body 1, and an outlet end of the water tank body 2 coupled to the respirator body 1 is disposed above the overflow channel 191, and when the water in the water tank body 2 is filled up and overflown, the water overflown from the water tank body 2 flows towards the overflow channel 191.

Further, a stop plate 181 is disposed above the breathing hole 18 for blocking the steam in the inner container of the dishwasher body to form water drops.

Further, a start section of the water channel 15 is tilted upwardly to the left to form a curved water channel section, and the curved water channel 15 allows the flowmeter 17 to yield an installation space and the water channel 15 to extend its length. By the design of the curved water channel 15, the water pressure inside the water channel 15 can be increased to accelerate the water flow.

Further, the inner container 81 has an upper shelf 84 and a lower shelf (83) 83 disposed therein, and the spraying arm 85 has an upper spraying arm 852 and a lower spraying arm 851, wherein the lower spraying arm 851 is disposed at the bottom of the lower shelf (83) 83, and the upper spraying arm 852 is disposed at the top or backside of the upper shelf 84. In other words, the hot washing pump 5 has a three-way diverter coupled to the heating washing pump 5, the upper spraying arm 852 and the lower spraying arm 851.

Further, a bake-drying device 86 is installed between the inner container 81 and the shell 88 for supplying warm air to the inner container 81, and the bake-drying device 86 comprises a fan 861, a PTC heating plate (acting as a heating device 863) and a ventilation pipe 862, and the ventilation pipe 862 is communicated with the fan 861 and the inner container 81, and the heating device 863 has an air channel formed between the fan 861 and the inner container 81.

Preferably, the ventilation pipe 862 is a curved pipe or a straight pipe communicated with a hot air inlet 811 of the inner container 81, and the hot air inlet 811 is disposed at the bottom on a side of the inner container 81, and the breathing hole 18 is disposed at the top of the other opposite side of the hot air inlet, and the fan 861 and the heating device 863 are operated together to produce hot air which is entered from hot air inlet 811 into the inner container 81 through the ventilation pipe 862, and then dispersed in the inner container 81 to dry the tableware and finally discharged from the breathing hole 18. The warm air inlet and the warm air outlet produce a sideway convection, and the warm air inlet disposed at the bottom of the inner container is helpful to ascend the warm air and improve the motion path of the warm air. In addition, the convection effect produced by the warm air outlet and the warm air inlet can increase the air speed effectively to increase the drying speed.

This invention further discloses a dishwasher method for determining a water supply mode, comprising a dishwasher body 8 and a control unit, and the dishwasher body 8 has the aforementioned dishwasher with a dual water entry mode which comprises a respirator body 1 and a water tank body 2, and the respirator body 1 or the water tank body 2 has a tap water inlet 11, a water-tank water inlet 12 and a washing water port 13, and the tap water inlet 11 is connected to tap water through a solenoid valve 7, and the water-tank water inlet 12 is coupled to the water tank body 2 through a water pump 4, and the tap water inlet 11 and the water-tank water inlet 12 share a common water channel 15 which is communicated with the washing water port 13, and the washing water port 13 is coupled to the inner container of the dishwasher body 8 or a water softener 3, and the water channel 15 is curved upwardly towards the respirator body 1 of the water tank body 2 and extended through the respirator body 1, and then parallelly returned to the water tank body 2, and the water channel 15 has a flowmeter 17, and the control unit is electrically coupled to the flowmeter 17, the water pump 4 and the solenoid valve 7; and the method comprises the following steps:

P1: Turn on the power, and control and open a solenoid valve by a control unit.

P2: Measure flow data of a water channel by a flowmeter, and send the flow data to the control unit.

P3: Compare the flow data by the control unit. If the flow data is equal to smaller than a predetermined value, then the control unit will decide not to input water from a tap water inlet. If the flow data is greater than the predetermined value, then the control unit will decide to input water from the tap water inlet and set the water entry mode of the dishwasher body to a tap water supply mode.

P4: If the control unit decides not to input water from the tap water inlet, then the control unit will shut the solenoid valve, and then the control unit will drive the water pump to stop quickly.

P5: Measure the flow data of the water channel by the flowmeter again and send the flow data to the control unit.

P6: Compare the flow data by the control unit. If the flow data is equal to or smaller than the predetermined value, then the control unit will decide not to input water from the water tank inlet. If the flow data is greater than the predetermined value, then the control unit will determine to input water from the water tank inlet and set the water entry mode of the dishwasher body to a water-tank water supply mode;

P7: End the determination, and enter the dishwasher body to a dishwashing mode.

Further, the order for the control unit to determine the dishwasher water entry mode to be the tap water supply mode and the water-tank water supply mode can be changed.

Further, the method comprises an alarm module electrically coupled to the control unit. If the control unit decides not to input water from the tap water inlet in the step P3 and not to input water from the water-tank water inlet in the step P6, then the control unit will control the alarm module to issue an alarm, and the dishwasher body will not enter into the dishwashing mode.

Further, if the control unit determines that the water entry mode of the dishwasher body is the tap water supply mode, the control unit will end the determination and enter the dishwasher into the dishwashing mode, Embodiment 2

Figure 4:
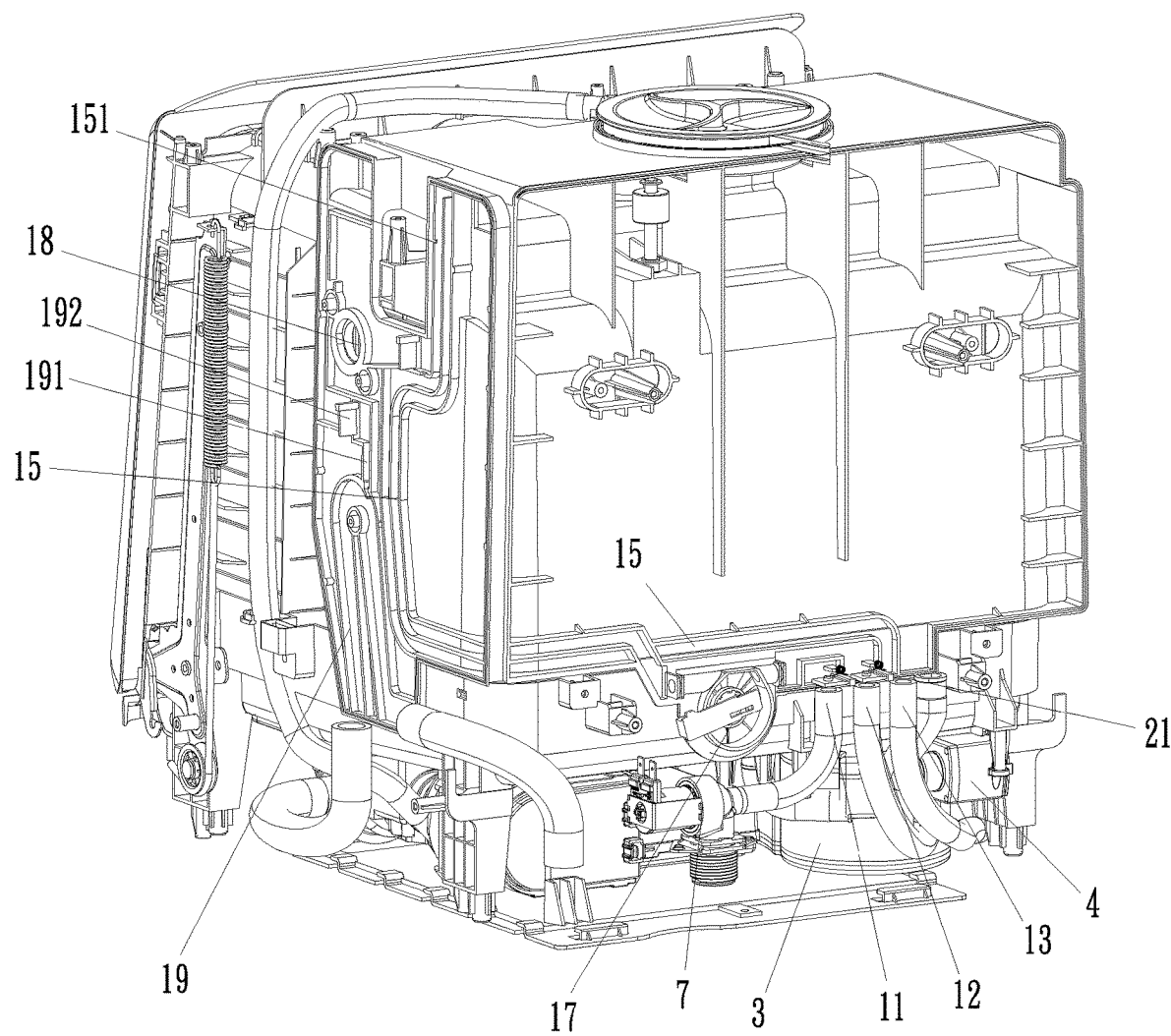
FIG. 4 is a schematic view of the internal structure of a water tank and a respirator of a dishwasher with a dual water entry mode in accordance with the first embodiment of the present invention.
Figure 5:
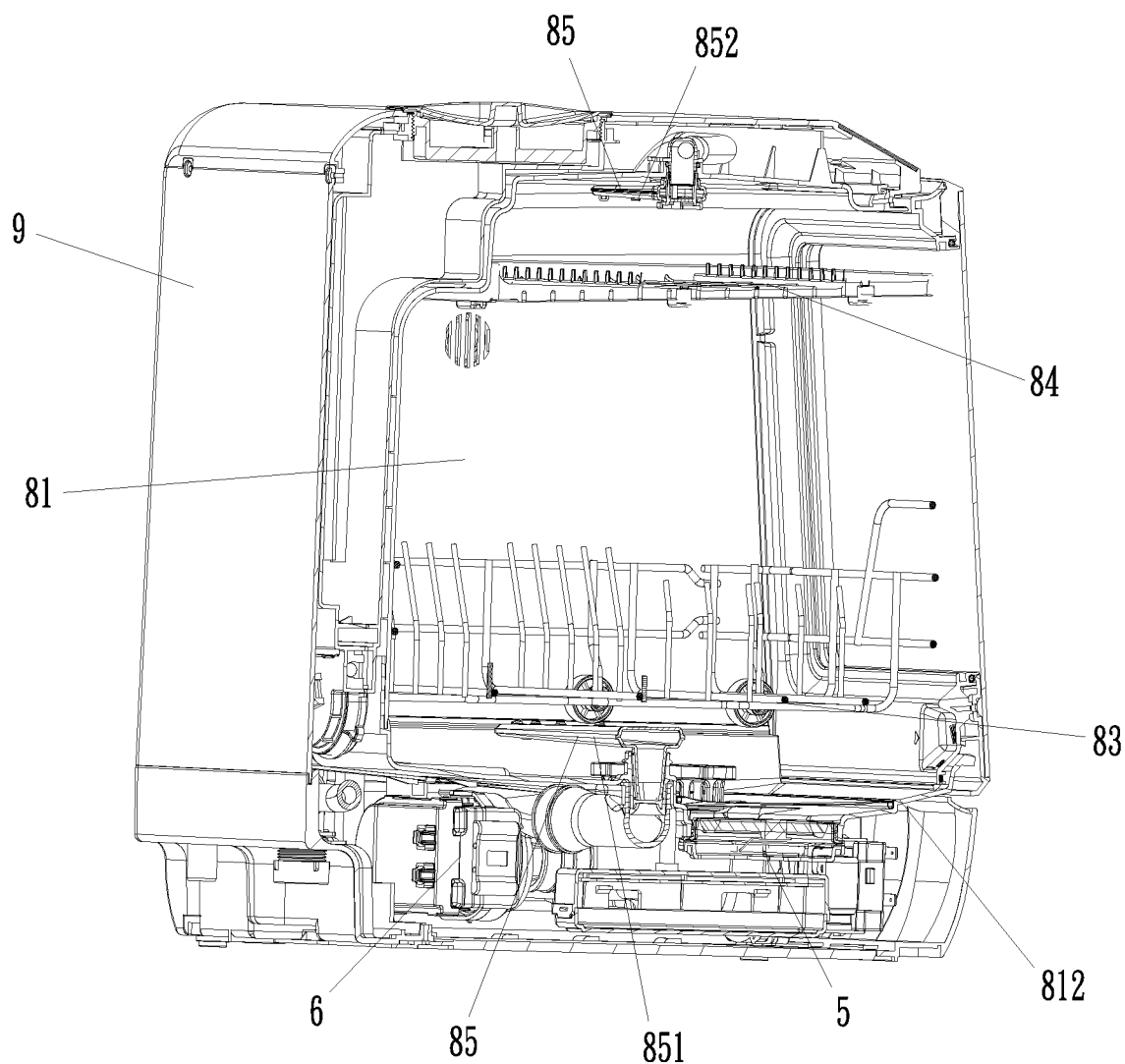
FIG. 5 is a cross-sectional view of a dishwasher with a dual water entry mode in accordance with the first embodiment of the present invention.
Figure 6:
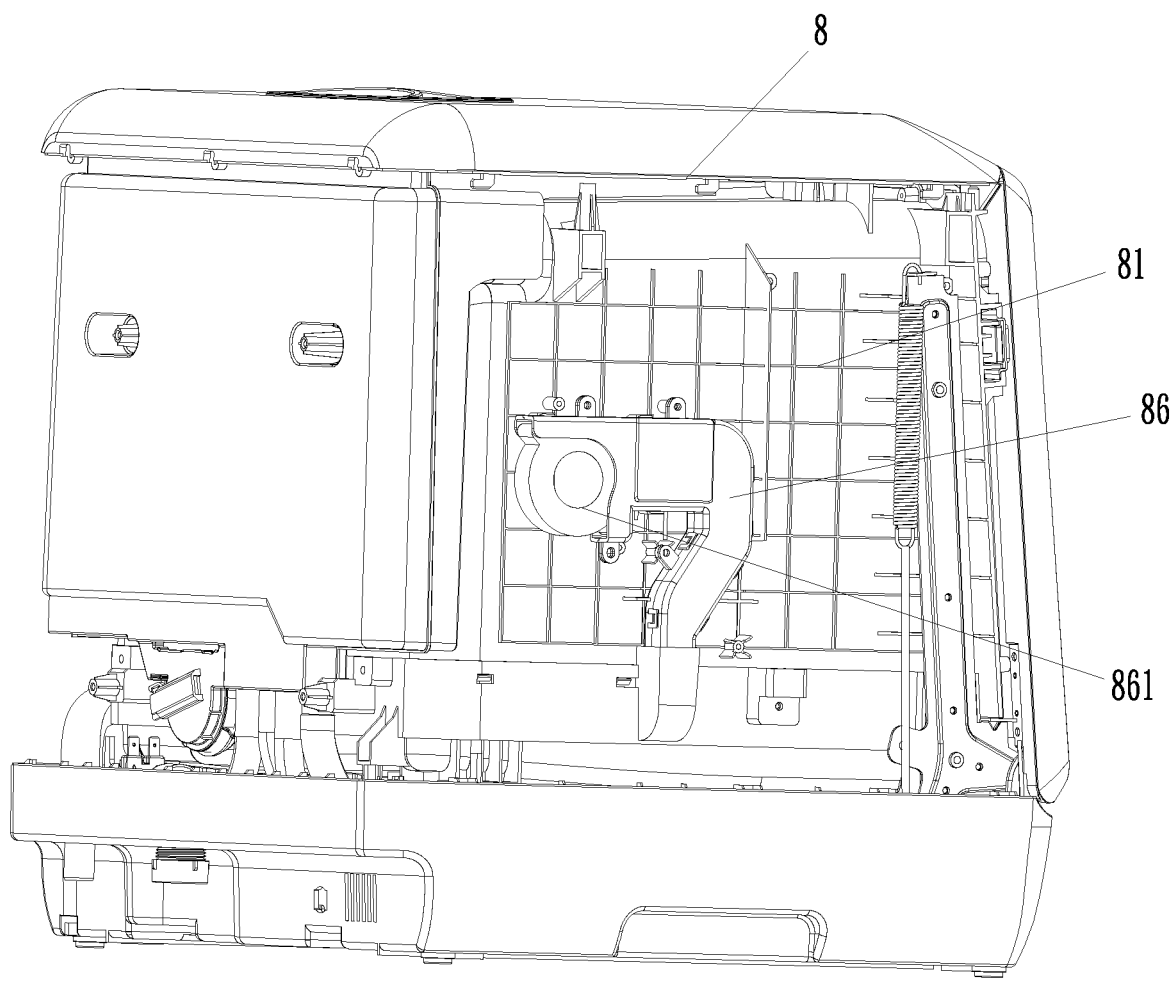
FIG. 6 is a schematic view of the structure of a bake-drying device of a dishwasher with a dual water entry mode in accordance with the first embodiment of the present invention.
Figure 7:
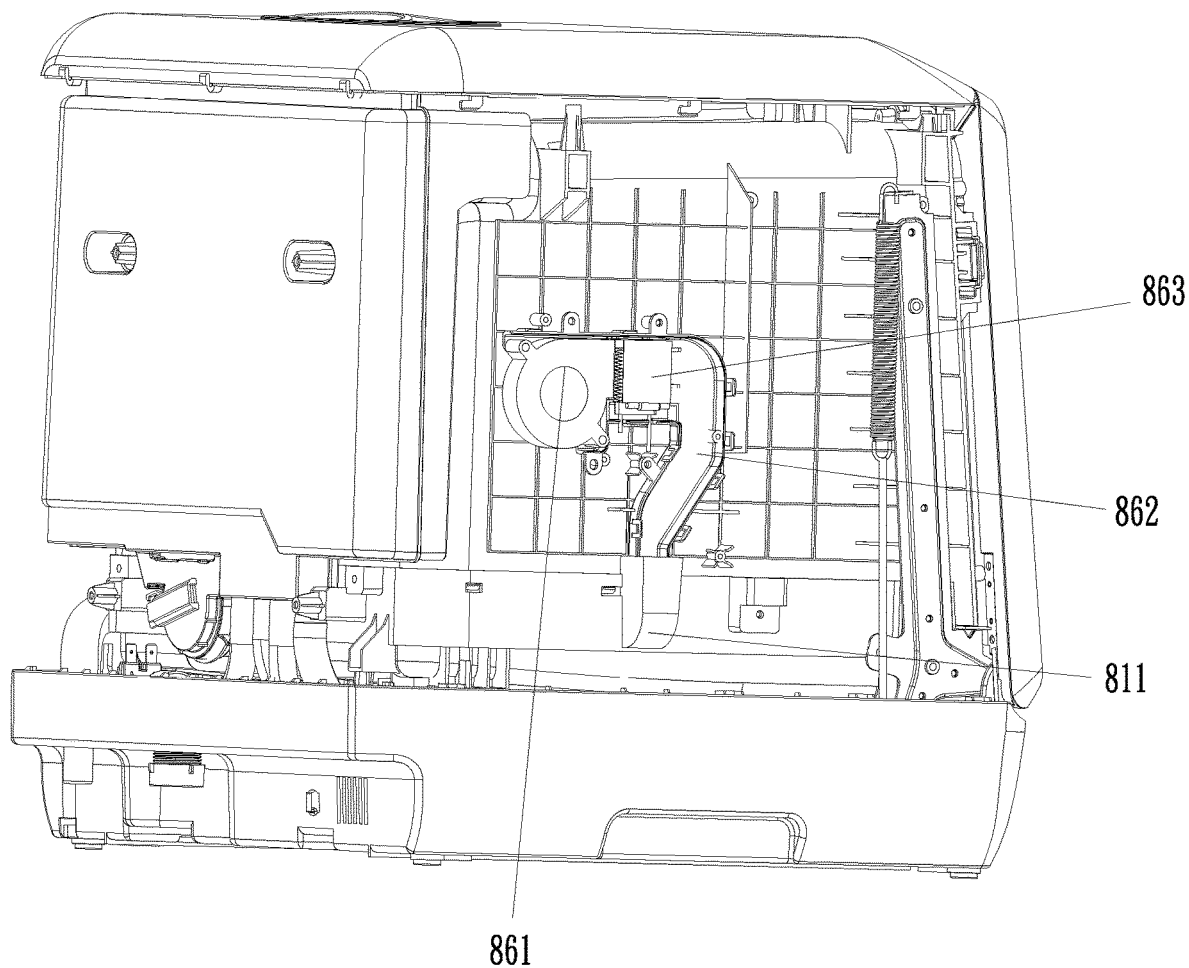
FIG. 7 is a schematic view of the internal structure of a bake-drying device of a dishwasher with a dual water entry mode in accordance with the first embodiment of the present invention.
Figure 8:
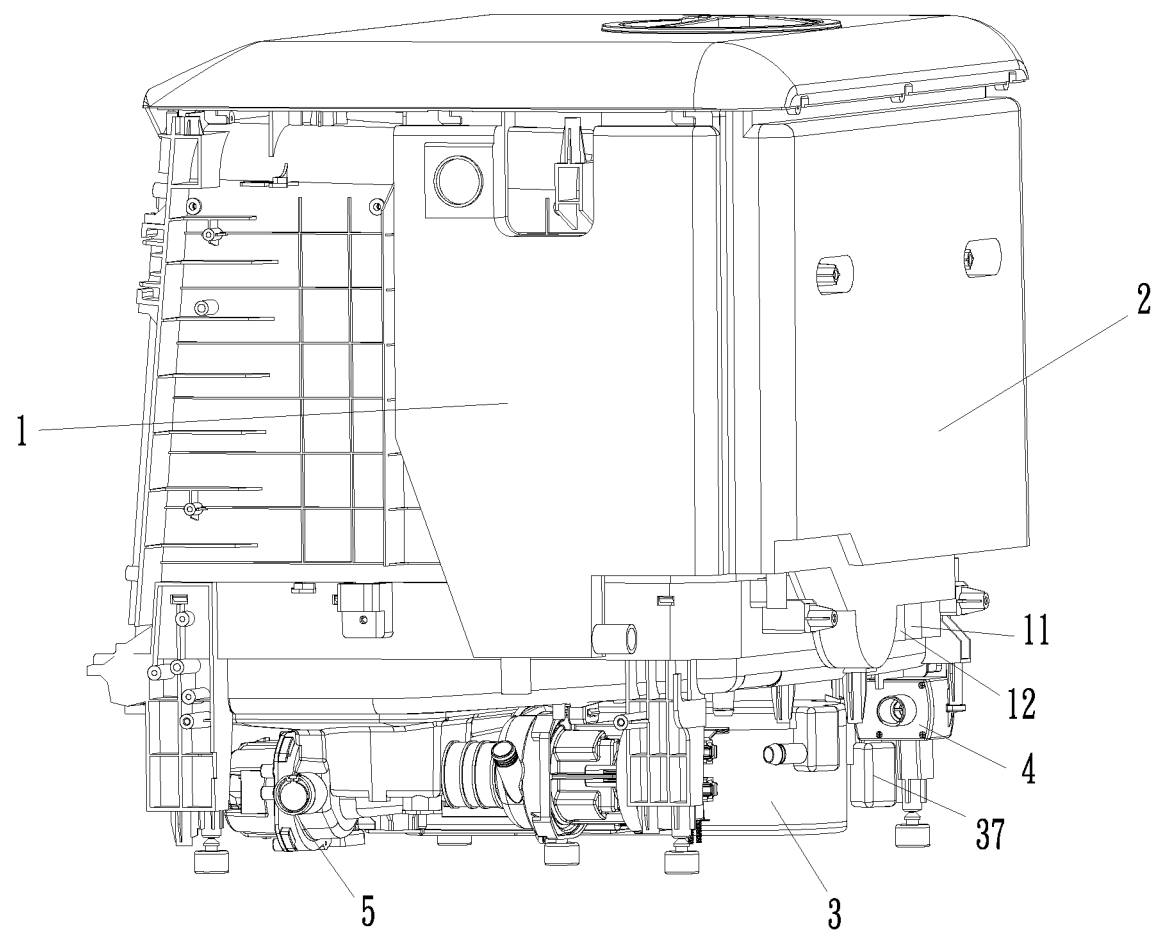
FIG. 8 is a schematic view of the structure of a water tank and a respirator in accordance with a second embodiment of the present invention.
Figure 9:
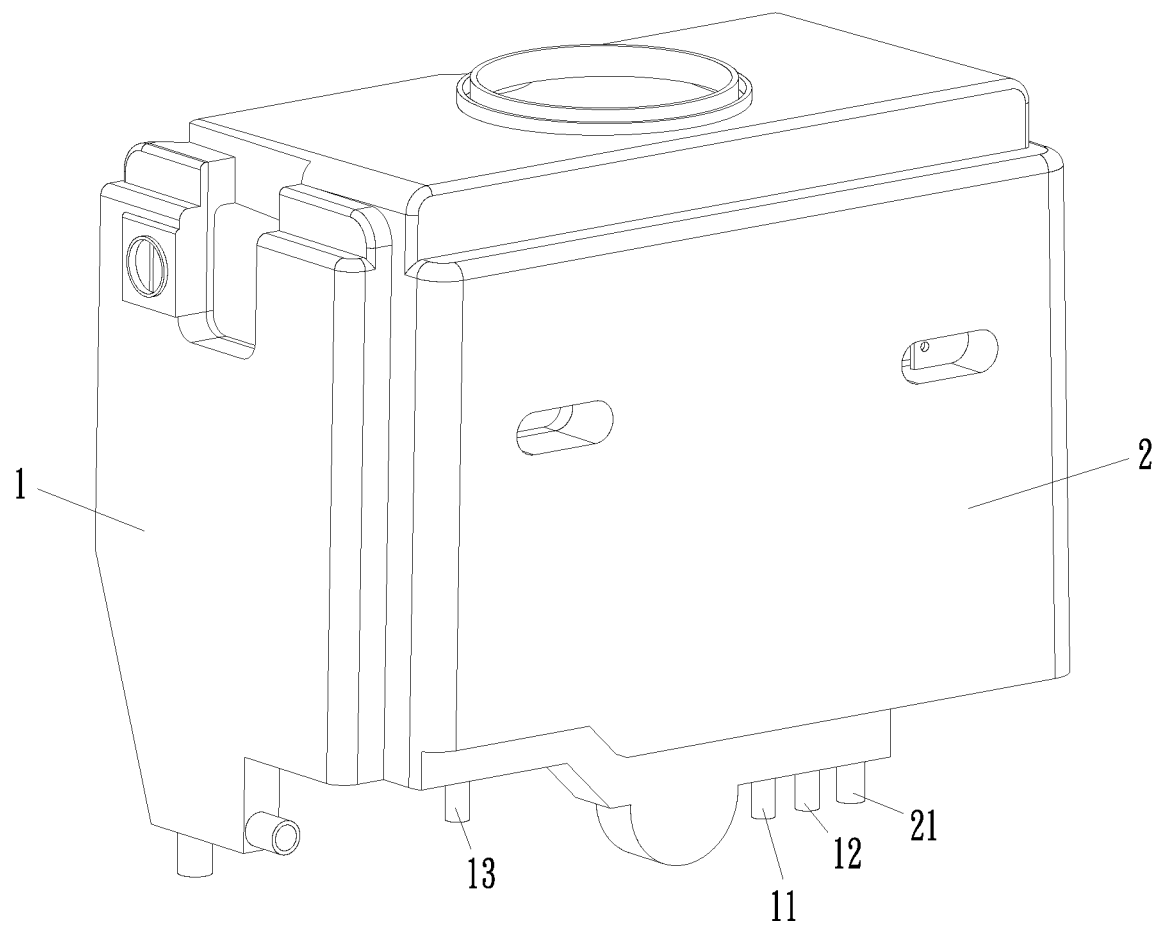
FIG. 9 is a schematic view of the structure of a water tank and a respirator of a dishwasher with a dual water entry mode in accordance with the second embodiment of the present invention.
Figure 10:
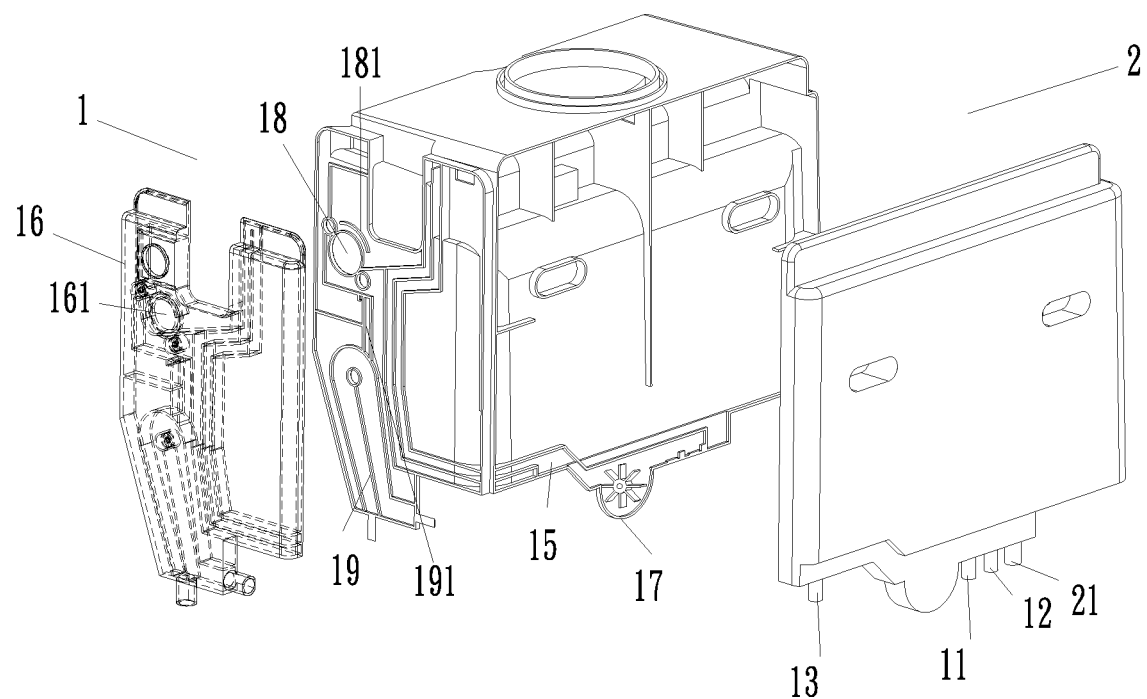
FIG. 10 is an exploded view of the structure of a water tank and a respirator of a dishwasher with a dual water entry mode in accordance with the second embodiment of the present invention.
Figure 11:
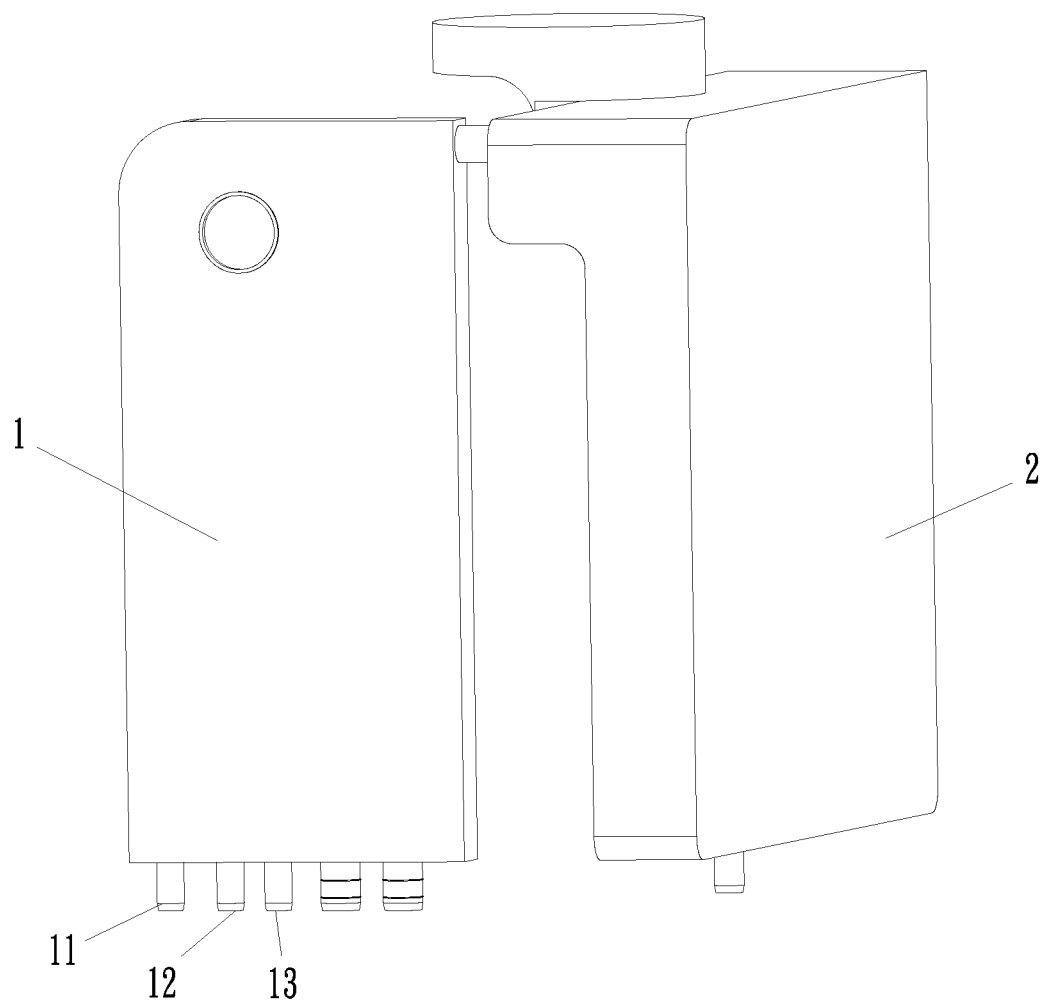
FIG. 11 is a schematic view of the structure of a water tank and a respirator of a dishwasher with a dual water entry mode in accordance with a third embodiment of the present invention.

With reference to FIGS. 4~6 for the second embodiment of the present invention, the difference between this embodiment and the first embodiment resides on that the washing water port 13 of this embodiment is disposed on the left side of the tap water inlet 11.

Embodiment 3

Figure 12:
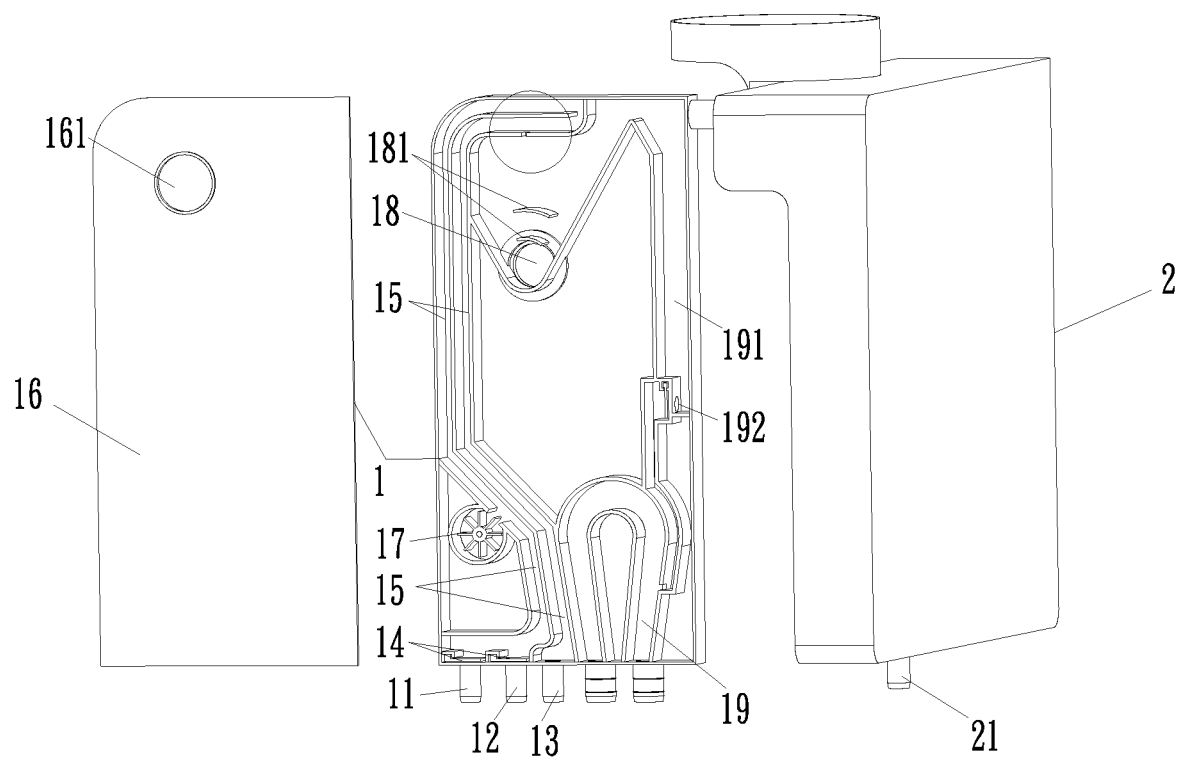
FIG. 12 is an exploded view of the structure of a water tank and a respirator of a dishwasher with a dual water entry mode in accordance with the third embodiment of the present invention.
Figure 13:
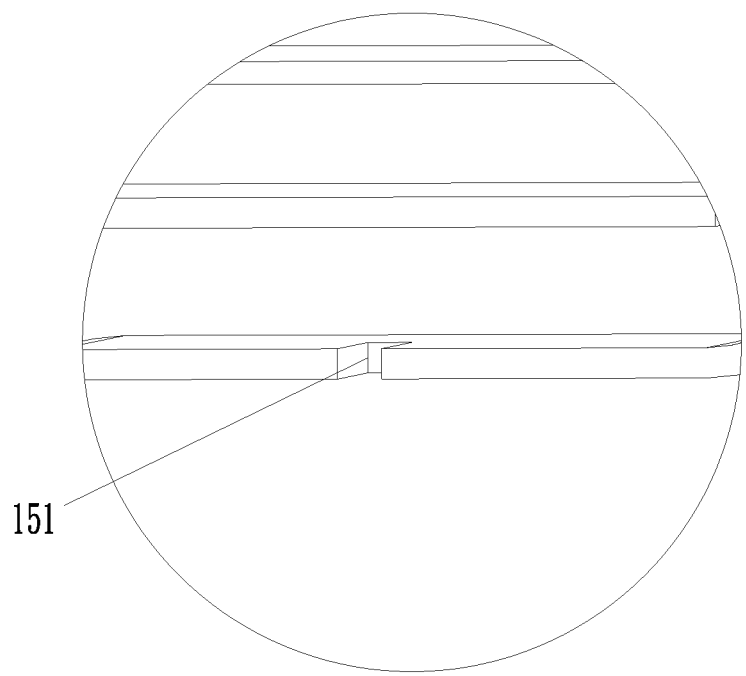
FIG. 13 is a partial blowup view showing the structure of a water tank and a respirator of a dishwasher with a dual water entry mode in accordance with a third embodiment of the present invention.
Figure 14:
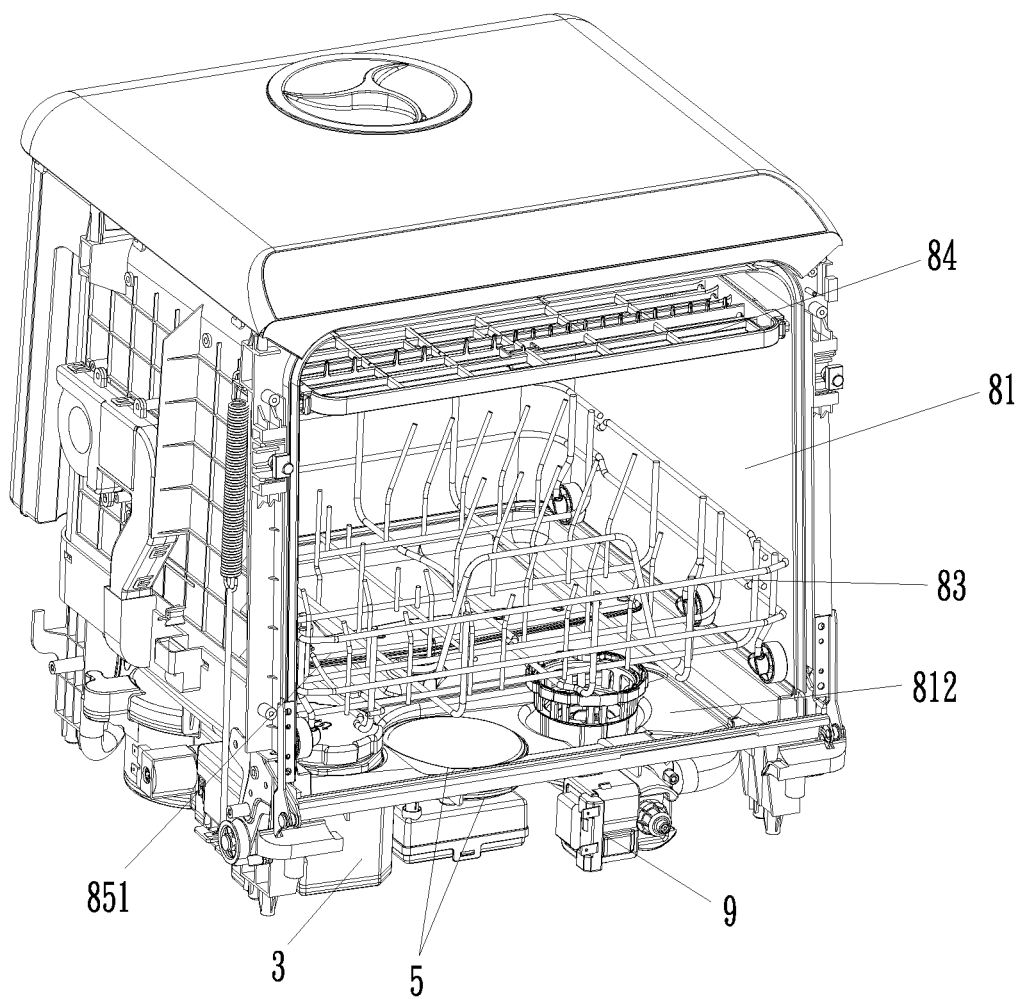
FIG. 14 is a schematic view of the internal structure of an inner container of a dishwasher with a dual water entry mode in accordance with the third embodiment of the present invention.
Figure 15:
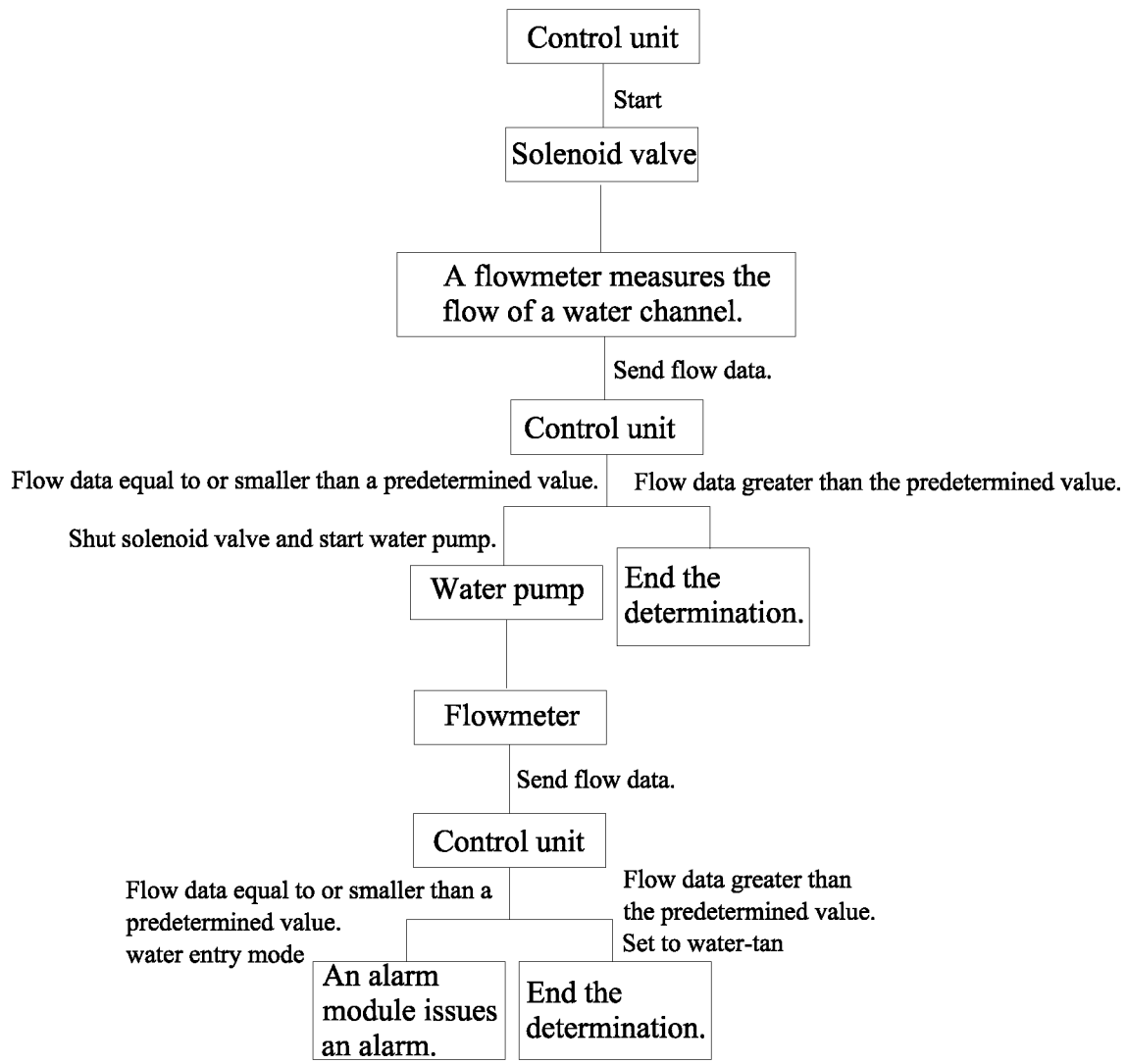
FIG. 15 is a flow chart of a method for determining a water supply mode of a dishwasher in accordance with an embodiment of the present invention embodiment.

With reference to FIGS. 12~13 for the third embodiment of the present invention, the difference between this embodiment and the first embodiment resides on that the washing water port 13, the tap water inlet 11 and the water-tank water inlet of this embodiment are disposed on the respirator body 1, and the water channel 15 is extended upwardly from the respirator body 1 and then returned to the bottom of the respirator body 1, and the water channel 15 has a flowmeter 17 installed thereon. By heightening the water channel 15, the water pressures of the water tank body 2 and the respirator body 1 will be the same, in order to prevent backflow.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

What is claimed is:

1. A dishwasher with a dual water entry mode, characterized in that the dishwasher comprises a shell and an inner container, a spraying arm, a heating washing pump, a washing pump, a water discharging pump and a respirator water tank disposed in the shell, and the respirator water tank is used for supplying water to the inner container; the heating washing pump is used for heating washing water; the washing pump is coupled to the inner container and the spraying arm and provided for circulating the washing water, and the water discharging pump is coupled to the inner container and the outside for discharging water; a water softener is either or not installed between the respirator water tank and a water supply channel of the inner container; the respirator water tank comprises a respirator body and a water tank body, and the respirator body or the water tank body has a tap water inlet, a water-tank water inlet and a washing water port, and the tap water inlet is connected to tap water through a solenoid valve, and the water-tank water inlet is coupled to a water tank through a water pump, and both of the tap water inlet and the water-tank water inlet are communicated with the washing water port, and the washing water port is coupled to the inner container of a dishwasher body or the water softener, and a front opening of the inner container has a door body installed thereon; and the respirator body has a breathing hole formed thereon and communicated with the inner container, and a cover of the respirator body has a vent hole configured to be opposite to the breathing hole, and the water channel has a vent formed thereon and communicated with the breathing hole, and the inner container has a drain formed thereon, and the respirator body has an invertedly U-shaped pipe coupled to the drain, and an overflow channel is formed between the U-shaped pipe and the breathing hole.

2. The dishwasher with a dual water entry mode as claimed in claim 1, characterized in that the respirator water tank has a water channel with an end coupled to the washing water port and the other end coupled to one or more water inlets selected from the tap water inlet and the water-tank water inlet, and both of the tap water inlet and the water-tank water inlet are one-way valves, and the water channel has a flowmeter for detecting the flow of the water channel, and the highest point of the water channel is slightly higher than the highest water level of the respirator water tank.

3. The dishwasher with a dual water entry mode as claimed in claim 1, characterized in that the water channel has a vent formed thereon and communicated with the breathing hole, and the overflow channel has a one-way valve installed thereon and provided for allowing the water of the overflow channel to move only in a direction towards the overflow channel water outlet.

4. The dishwasher with a dual water entry mode as claimed in claim 3, characterized in that the water tank body has a top communicated with the top of the respirator body, and when the water in the water tank body is filled up and overflowed, the water overflown from the water tank body flows towards the overflow channel.

5. The dishwasher with a dual water entry mode as claimed in claim 1, characterized in that the inner container has an upper shelf and a lower shelf, and the spraying arm has an upper spraying arm and a lower spraying arm, and the lower spraying arm is disposed at the bottom of the lower shelf, and the upper spraying arm is disposed at the top or the backside of the upper shelf.

6. The dishwasher with a dual water entry mode as claimed in claim 1, characterized in that a bake-drying device is installed between the inner container and the shell for supplying warm air to the inner container, and the bake-drying device comprises a fan, a heating device and a ventilation pipe, and the ventilation pipe is communicated with the fan and the inner container, and the heating device is installed in an air channel between the fan and the inner container.

7. The dishwasher with a dual water entry mode as claimed in claim 1, characterized in that the inner container has a warm air inlet formed at the bottom of the inner container and a warm air outlet formed at the top of the inner container, and the warm air inlet and the warm air outlet produce a sideway convection.

8. A dishwasher method for determining a water supply mode, characterized in that the method comprises using a dishwasher body and a control unit, and the dishwasher with a dual water entry mode as claimed in claim 1, is installed to the dishwasher body, and the dishwasher with a dual water entry mode comprises a respirator body and a water tank body, and the respirator body or the water tank body has a tap water inlet, a water-tank water inlet and a washing water port, and the tap water inlet is coupled to tap water through a solenoid valve, and the water-tank water inlet is coupled to the water tank body through a water pump, and the tap water inlet and the water-tank water inlet share a water channel which is communicated with the washing water port, and the washing water port is coupled to an inner container of the dishwasher body or a water softener, and the water channel is curved in a direction from the water tank body or the respirator body towards the respirator body or the water tank body and extended upwardly through the respirator body and then parallelly returned to the water tank body, and the water channel has a flowmeter installed thereon, and the control unit is electrically coupled to the flowmeter, the water pump and the solenoid valve; and the method comprises:

P1: turning on the power, and controlling and opening the solenoid valve by the control unit;

P2: using the flowmeter to measure flow data of the flow in the water channel and sending the flow data to the control unit;

P3: using the control unit to compare the flow data, wherein if the flow data is equal to zero or smaller than a predetermined value, then the control unit will decide not to input water from the tap water inlet; and if the flow data is greater than the predetermined value, then the control unit will decide to input water from the tap water inlet, and the water entry mode of the dishwasher body will be a tap water supply mode;

P4: turning off the solenoid valve when the control unit determines not to input water from the tap water inlet, and then driving the water pump by the control unit to stop quickly;

P5: using the flowmeter to measure the flow data in the water channel again and sending the flow data to the control unit;

P6: using the control unit to compare the flow data, wherein if the flow data is equal to zero or smaller than the predetermined value, then the control unit will decide not to input water from the water tank inlet, and if the flow data is greater than the predetermined value, then the control unit will decide to input water from the water tank inlet, and the water entry mode of the dishwasher body is a water-tank water supply mode; and P7: ending the determination, and setting the dishwasher body to a dishwashing mode.

9. The dishwasher method for determining a water supply mode as claimed in claim 8, characterized in that the method further comprises using an alarm module electrically coupled to the control unit and controlled by the control unit to provide an alarm when the control unit decides not to input water from the tap water inlet in the step P3 and not to input water from the water-tank water inlet in the step P6, and not to set the dishwasher body to the dishwashing mode, and the control unit ends the determination and sets the dishwasher to the dishwashing mode when the control unit determines that the water entry mode of the dishwasher body is the tap water supply mode, and the order of determining the dishwasher water entry mode by the control unit to be the tap water supply mode and to be the water-tank water supply mode can be changed.

* * * * *